United States Patent
Jones et al.

(10) Patent No.: US 7,548,157 B2
(45) Date of Patent: *Jun. 16, 2009

(54) BATTERY BACKED SERVICE INDICATOR AIDS FOR FIELD MAINTENANCE

(75) Inventors: Carl E. Jones, Tucson, AZ (US); Robert A. Kubo, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 11/735,791

(22) Filed: Apr. 16, 2007

(65) Prior Publication Data

US 2007/0182542 A1 Aug. 9, 2007

Related U.S. Application Data

(63) Continuation of application No. 10/976,202, filed on Oct. 27, 2004, now Pat. No. 7,259,665.

(51) Int. Cl.
- G08B 29/00 (2006.01)
- G08B 17/10 (2006.01)
- G08B 21/00 (2006.01)
- G08B 5/00 (2006.01)
- G06F 1/16 (2006.01)
- G11C 5/14 (2006.01)
- F21V 7/04 (2006.01)

(52) U.S. Cl. .............. 340/514; 340/506; 340/513; 340/628; 340/629; 340/630; 340/631; 340/635; 340/815.42; 340/815.45; 340/815.55; 361/683; 361/684; 361/685; 361/686; 365/226; 365/227; 365/228; 365/229; 362/555; 362/611; 362/612

(58) Field of Classification Search ................ 340/513, 340/514, 815.42, 815.45, 815.55, 628–632, 340/506; 361/683–686; 320/120, 136; 365/226–229; 362/555, 611, 612
See application file for complete search history.

(56) References Cited

U.S. PATENT DOCUMENTS 4,168,796 A 9/1979 Fulks et al.

(Continued)

FOREIGN PATENT DOCUMENTS

CN 1353837 6/2002

(Continued)

OTHER PUBLICATIONS

Abstract of JP 04-348413 A, dated Dec. 3, 1992.

(Continued)

*Primary Examiner*—Benjamin C Lee
*Assistant Examiner*—Lam P Pham
(74) *Attorney, Agent, or Firm*—Scully, Scott, Murphy & Presser, P.C.

(57) ABSTRACT

A self-contained backup power source such as a battery is provided for components within an electrically powered device such as a storage controller, photocopier or the like, to maintain diagnostic status data and to power a service indicator aid, or diagnostic indicator, such as an LED. A switch selects the backup power source when a primary power source of the electrically powered device is no longer available to the component, such as when the component is removed from the electrically powered device, the primary power source is disconnected as a safety precaution when servicing or replacing the component, or a higher-level assembly, in which the component is provided, is removed from the electrically powered device. The diagnostic indicator may be powered separately from the data storage device.

13 Claims, 5 Drawing Sheets

U.S. PATENT DOCUMENTS

| | | | |
|---|---|---|---|
| 4,194,113 | A | 3/1980 | Fulks et al. |
| 4,196,386 | A | 4/1980 | Phelps |
| 5,519,832 | A | 5/1996 | Warchol et al. |
| 5,574,436 | A * | 11/1996 | Sisselman et al. ........... 340/663 |
| 5,604,708 | A | 2/1997 | Helms et al. |
| 5,673,028 | A | 9/1997 | Levy et al. |
| 6,095,851 | A | 8/2000 | Laity et al. |
| 6,098,131 | A | 8/2000 | Unger et al. |
| 6,114,866 | A | 9/2000 | Matsuo et al. |
| 6,161,958 | A | 12/2000 | Rattman et al. |
| 6,433,698 | B1 | 8/2002 | Schweitzer, Jr. et al. |
| 6,762,930 | B2 | 7/2004 | Minne |
| 6,867,704 | B2 | 3/2005 | Pellegrino |
| 7,161,485 | B2 * | 1/2007 | Melman ................ 340/539.18 |
| 7,161,495 | B1 * | 1/2007 | Kilbourne et al. ...... 340/815.45 |
| 2003/0136849 | A1 | 7/2003 | Adelmann |

FOREIGN PATENT DOCUMENTS

EP    1351149    10/2003

OTHER PUBLICATIONS

Abstract of JP 09-261889 A, dated Oct. 3, 1997.
Chinese Office Action dated Apr. 11, 2008.

* cited by examiner

BATTERY BACKED SERVICE INDICATOR AIDS FOR FIELD MAINTENANCE

RELATED APPLICATIONS

This application is a continuation application of U.S. Ser. No. 10/976,202, filed Oct. 27, 2004.

FIELD OF THE INVENTION

The invention relates generally to the field of service indicators such as diagnostic LEDs that are used to display information regarding a component of an electrically powered device such as a computer storage system, photocopier or the like, and, more specifically, to a way of providing backup power so that the service indicator continues to be active even when power is removed from the component.

DESCRIPTION OF THE RELATED ART

Various electrically powered devices such as computer systems, storage controllers, photocopiers and many others have a diagnostic functionality to indicate when servicing or replacement of their components is needed. Diagnostic control logic may process signals from sensors and actuators of the components to determine when a component is not performing properly or otherwise requires servicing, for instance. The components may have diagnostic indicators, e.g., service aid indicators, such as LED lights, that are illuminated to convey specified information. In a simple case, the light is illuminated when the component requires attention. In other cases, a series of flashes identifies the type of attention that is needed. However, for devices that have packaging concepts that require component assemblies to be removed from a chassis and therefore an associated electrical power source, the use of the diagnostic indicators to direct maintenance actions is compromised. Typically, the electrical power at the device is disconnected from the component, e.g., when the component is removed from the device, when a component is a subassembly located within a higher level assembly that must be removed from a chassis and disassembled, or when the technician switches off the power to the component for safety reasons, e.g., to avoid being shocked while working on the component.

For example, during field maintenance of such devices, a directed service action is typically performed, where the device has identified and isolated a failure to a component within a subassembly that cannot be seen by the technician while the subassembly is installed within the higher order assembly. The service action may include servicing, including repair or cleaning, or replacement of a component, for instance. The technician may therefore require access to components internal to a sub-assembly to continue the maintenance activity. For instance, when a memory module is being serviced within a computer chassis, a common practice is for the technician to remove power to the computer chassis prior to disassembly. Once power has been removed from the chassis, service/diagnostic indicators that are powered from the chassis power source no longer have power. Once the chassis is opened, the technician wants to identify which component is being identified, by its diagnostic indicator, for servicing or replacement. In such situations, when the diagnostic indicator is no longer powered, it cannot aid the technician at a time when it is most needed.

BRIEF SUMMARY OF THE INVENTION

The present invention addresses the above and other issues by providing a technique that allows a diagnostic indicator to be powered from an alternative, independent power source when normal system power is removed from a component, thereby preserving the use of the diagnostic indicator to complete a maintenance task.

Specifically, dual power sources are provided for the diagnostic indicator. The primary source is the normal system power of the device in which the component is installed. Typically, this power source is based on AC power from an electrical outlet. The AC input power source can be conditioned to become DC power used by the internal circuitry and control functions. An alternate source is a self-contained power source such as a battery that can be located within or on the component itself. By using the device's power source as the primary power source, the life of the alternate power source is preserved. Moreover, when the component needs to be removed from the device and, therefore, from the primary power source, the state of the diagnostic indicator is latched and shifted to the alternate power source, thereby preserving the functionality of the diagnostic indicator.

In one aspect of the invention, a component in an electrically powered device for performing a function of the electrically powered device includes a diagnostic indicator for indicating a diagnostic status of the component. The diagnostic indicator receives power from a primary power source that is associated with the electrically powered device when the primary power source is available to the component. The component also includes a self-contained power source, and at least one switch for connecting the self-contained power source to power the diagnostic indicator when the primary power source is unavailable to the component, In a further aspect of the invention, a component of the above-mentioned type includes means for indicating a diagnostic status of the component, wherein the means for indicating receives power from a primary power source that is associated with the electrically powered device when the primary power source is available to the component, a self-contained power source, and means for connecting the self-contained power source to power the diagnostic indicator when the primary power source is unavailable to the component.

In a further aspect of the invention, an apparatus for use in a component in an electrically powered device includes a self-contained power source, and at least one switch for connecting the self-contained power source to power a diagnostic indicator of the component when a primary power source that is associated with the electrically powered device is unavailable to the component. The diagnostic indicator indicates a diagnostic status of the component.

In a further aspect of the invention, an apparatus for use in a component in an electrically powered device includes a self-contained power source, and at least one switch for connecting the self-contained power source to power a data storage device of the component when a primary power source that is associated with the electrically powered device is unavailable to the component. The data storage device stores data for identifying a diagnostic status that is to be indicated by a diagnostic indicator of the component.

In a further aspect of the invention, a component of the above-mentioned type includes a data storage device for storing data for identifying the diagnostic status that is to be indicated by the diagnostic indicator, wherein the data storage device receives power from a primary power source that is associated with the electrically powered device when the primary power source is available to the component, a self-contained power source, and at least one switch for connecting the self-contained power source to power the data storage device to maintain the data stored thereat when the primary power source is unavailable to the component.

In a further aspect of the invention, a component in an electrically powered device for performing a function of the electrically powered device includes means for indicating a diagnostic status of the component, and means for storing data for identifying the diagnostic status that is to be indicated by the means for indicating. The means for storing data receives power from a primary power source that is associated with the electrically powered device when the primary power source is available to the component. The component further includes a self-contained power source, and means for connecting the self-contained power source to power the data storage device to maintain the data stored thereat when the primary power source is unavailable to the component.

In a further aspect of the invention, a method for powering a component having a diagnostic indicator, where the component is provided in an electrically powered device for preforming a function of the electrically powered device, includes: (a) receiving power, at the component, from a primary power source that is associated with the electrically powered device when the primary power source is available to the component, (b) connecting the primary power source to power the diagnostic indicator when the primary power source is available to the component, and (c) connecting a self-contained power source of the component to power the diagnostic indicator when the primary power source is unavailable to the component.

In a further aspect of the invention, a method for powering a component having a diagnostic indicator and a data storage device, where the component is provided in an electrically powered device for performing a function of the electrically powered device, includes: (a) storing, at the data storage device, data for identifying a diagnostic status of the component that is to be indicated by the diagnostic indicator, (b) receiving power, at the component, from a primary power source that is associated with the electrically powered device when the primary power source is available to the component, (c) connecting the primary power source to power the data storage device when the primary power source is available to the component, and (d) connecting a self-contained power source of the component to power the data storage device when the primary power source is unavailable to the component.

Corresponding program storage devices may also be provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

In a system that uses diagnostic indicators to assist in maintenance identification of components, the invention provides an alternate power source and a means of latching the indicator state that is powered from the alternate power source. When a maintenance activity that will remove the normal power source from the diagnostic indicator is required, the system places the indicator into a state that is required for the service activity and transfers the latched state and power source for the indicator to the alternate source. This can be done either manually by the technician, such as by moving a switch, or automatically, such as upon removal of normal power to the indicator. The state of the indicators is maintained and the service activity can continue to exploit the diagnostic indicators with the higher-level assembly removed from the enclosure/chassis.

As indicated, various electrically powered devices have packaging concepts that require component assemblies to be removed from a chassis. For example, a high availability storage controller such as IBM's TotalStorage SAN Volume Controller has many components with diagnostic functionality. Such devices include a number of components that are subassemblies located within a higher-level assembly that is removed from a chassis. Furthermore, high availability RAID storage systems will have "dual active" controllers, with potentially many independent subsystems within the higher-level system or enclosure chassis. For example, Controller Node Assemblies include Memory, Processors, Plug-In Adapters (e.g., PCI Cards), and Voltage Regulator Modules. A Power Supply includes Power Control Modules and Voltage Regulator Modules. Uninterruptible Power Supplies/Battery Units include a Battery Pack Assembly and Controller Logic Module. Other example components include Operator/Control Panels, Hard Disk Drives, and Fans/Blowers. Various other components in other types of electrically powered devices, including photocopiers, printers and the like, will be apparent to those skilled in the art. Generally, each component performs some function of the device.

A rudimentary diagnostic indicator provides an indication of a component that has failed within a device and therefore requires service or replacement. An LED placed in proximity to the component requiring service is an example. The concept can be extended to lock/latch in some diagnostic error information in a subassembly, e.g., using seven-segment LED displays, if desired. Moreover, as mentioned, sequences of flashes may convey specific diagnostic information as well.

Figure 1:
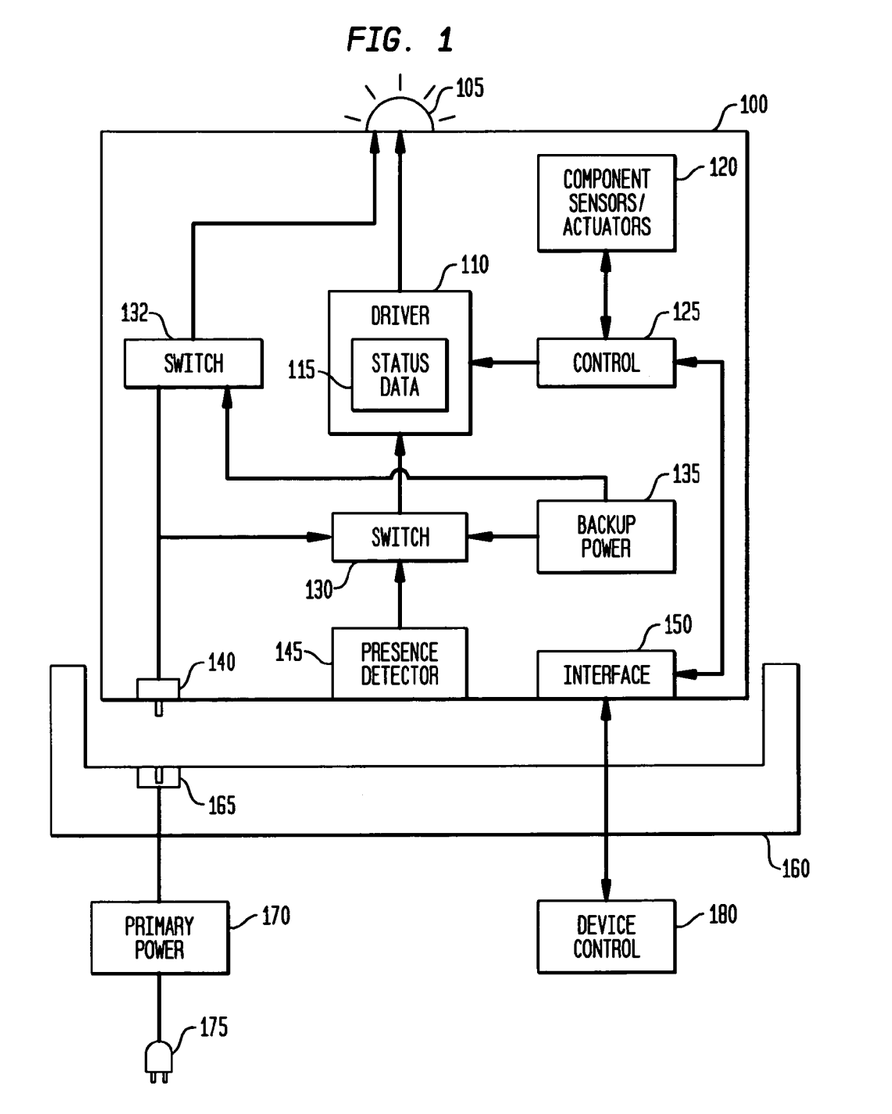
FIG. 1 illustrates a component in an electrically powered device, where diagnostic data can be produced at the component or received from a device control, according to the invention.

FIG. 1 illustrates a component in an electrically powered device, where diagnostic data can be produced at the component or received from a device control, according to the invention. The component 100 is removably received in a slot 160 in a chassis of an electrically powered device, or otherwise installed in the device. The component 100 is removable from the electrically powered device typically for at least one of servicing and replacement, although it is not necessary for the component to be removable. While one component is discussed, note that the invention may be used with any number of components in a device. Moreover, one diagnostic indicator may be associated with multiple related components, and more than one indicator may be associated with one component. The component 100 includes a diagnostic indicator 105 such as an LED light, although other lights as well as audible indicators such as buzzers may be used as well. The diagnostic indicator 105 can be provided on a housing of the component, for instance, such as on a location on the housing that assists a user in locating the component within the electrically powered device. For example, the indicator 105 may be located on the component 100 so that it is visible when an access door of the device or a higher-level assembly is opened.

A driver circuit 110 may be used to drive the indicator. For example, when the indicator is an LED, the driver 110 may be an LED driver circuit. The indicator 105 may be driven to provide a series of flashes for example. The driver circuit 110 may not be needed depending on the type of indicator used and the manner in which it is controlled. For example, when it is desired for the LED to appear to be illuminated, an LED driver circuit uses a series of high-frequency, short duration pulses to trick the eye into thinking it sees a continuous light, while avoiding overheating and burnout of the LED. However, other types of lights such as incandescent bulbs can withstand long periods of relatively high currents, in which case a driving circuit may not be needed. For example, it may be sufficient to connect a steady power supply to the light to indicate that servicing is needed.

A data storage device 115 is used for storing data for identifying the diagnostic status that is to be indicated by the diagnostic indicator 105. The driver 110 associated with the data storage device 115 thus drives the diagnostic indicator 105 according to the data. Any type of data storage device may be used. For example, the data storage device 115 may include a latch, or a volatile memory such as RAM. The data storage device 115 may store data as simple as one bit indicating whether the indicator should be powered or not. Or, the stored data may indicate a control mode to be used by the driver 110 in driving the indicator 105. For example, two bits of data may be stored to identify up to four different control modes. Typically, the data storage device 115 requires power to maintain the data—if power is lost, the data is lost as well.

The data for controlling the indicator 105 may be provided locally, such as from a control 125 of the component 100, when the component 100 has on-board diagnostics, or the data may be received from outside the component 100. For example, a higher-level device control 180 may provide data to the component 100 via the component interface 150. A central control in the device that controls the state of the diagnostic indicators in one or more components is useful in setting maintenance conditions for order-dependent tasks. Sensors and/or actuators 120 of the component 100 provide signals to the control 125 and/or the device control 180 for processing by diagnostic logic to determine a diagnostic status of the component. For example, the diagnostic logic may detect that an actuator is not working properly, in which case appropriate status data is provided to the data storage device 115 for use in driving the indicator 105. The control 125 and/or the device control 180 may have associated program storage devices such as memories for storing software instructions that are executed to achieve the desired functionality.

Generally, the invention may use one or more program storage devices tangibly embodying or otherwise storing a program of instructions, e.g., software or microcode, executable by a machine, e.g., one or more processors, to achieve all or part of the functionality described herein.

A backup power device 135 is a self-contained power source such as a battery. In normal operation, when the electrically powered device is not being serviced, the component 100 receives power from a primary power source 170 of the device. For example, a jack 140 on the component may connect to a socket 165 in the slot 160 of the electrically powered device. A switch 130 connects either the jack 140 or the backup power source 135 to the driver 110 and data storage device 115, and optionally to other circuits in the component 100 as well, such as the control 125. The indicator 105 is also powered, directly or indirectly, by the power source selected by the switch 130. A further switch 132 may be provided to separately route the primary or backup power to the diagnostic indicator 105, as discussed further below. The functionality of the switches 130 and 132 may be combined as well into one device.

The switch 130 may be configured to select the jack 140 when the primary power is present via the jack 140. For example, the switch 130 may include circuitry having diodes, transistors or other elements that are activated based on whether the primary power supply is present on the line from the jack 140. Various approaches apparent to those skilled in the art may be used. For example, the switch 130 may use a comparing circuit to compare the power level on the jack 140 to the power level of the backup power source 135, and select the backup power source when the primary power level is less than the back power level. Or, the switch 130 may assess an absolute level of the power level on the jack 140, and select the backup power source 135 if the level is below a predetermined level.

The primary power at the jack 140 may be unavailable to the component 100 for various reasons. For example, the component 100 may be removed from the slot 160, in which case the jack 140 is disconnected from the socket 165. Moreover, even when the component 100 is installed in the slot 160, the primary power source 170 may be shut down to the entire device for safety reasons by the technician. In another possibility, the component 100 is provided in a slot in a higher-level assembly, and the higher level assembly is connected to the primary power source 170 such as via a jack and socket. The primary power source is then unavailable to the higher-level assembly and the component when the user removes the higher-level assembly from the electrically powered device to access the component 100.

Furthermore, the switch 130 may be responsive to a presence detector 145, which indicates whether the component 100 is installed in the electrically powered device, such as in the slot 160, or the component 100 has been removed from the electrically powered device. For example, the presence detector 145 may use an electrical contact that is connected to ground via the slot 160 when the component 100 is installed, or a mechanical plunger switch or other switch that is physically actuated when the component 100 is installed in the slot 160, thereby opening or closing an electrical path that is detected by the switch 130. The switch 130 may be responsive to the presence detector 145 in different ways. For example, the switch 130 may connect the backup power source 135 to the indicator 105, driver 10 and data storage device 115 when the presence detector 145 indicates the component has been removed from the slot 160 and therefore has lost the primary power source. Or, the switch 132 may delay connecting the backup power source 135 to the diagnostic indicator 105 until the presence detector 145 indicates the component has been removed from the slot 160, for example, by the technician.

The primary power source 170 may be powered by AC power, such as from a plug 175 to a wall outlet or to a higher voltage power supply. The primary power source 170 steps down the voltage and provides it to the various components within the device at a desired level.

Note that the functionality discussed herein may be achieved by any configuration and arrangement of elements. The configuration and arrangement shown in FIG. 1 and elsewhere is meant to be an example only. For example, the functionality of different elements may be combined into one element, or the functionality of one elements as described may be spread out among multiple elements.

Figure 2:
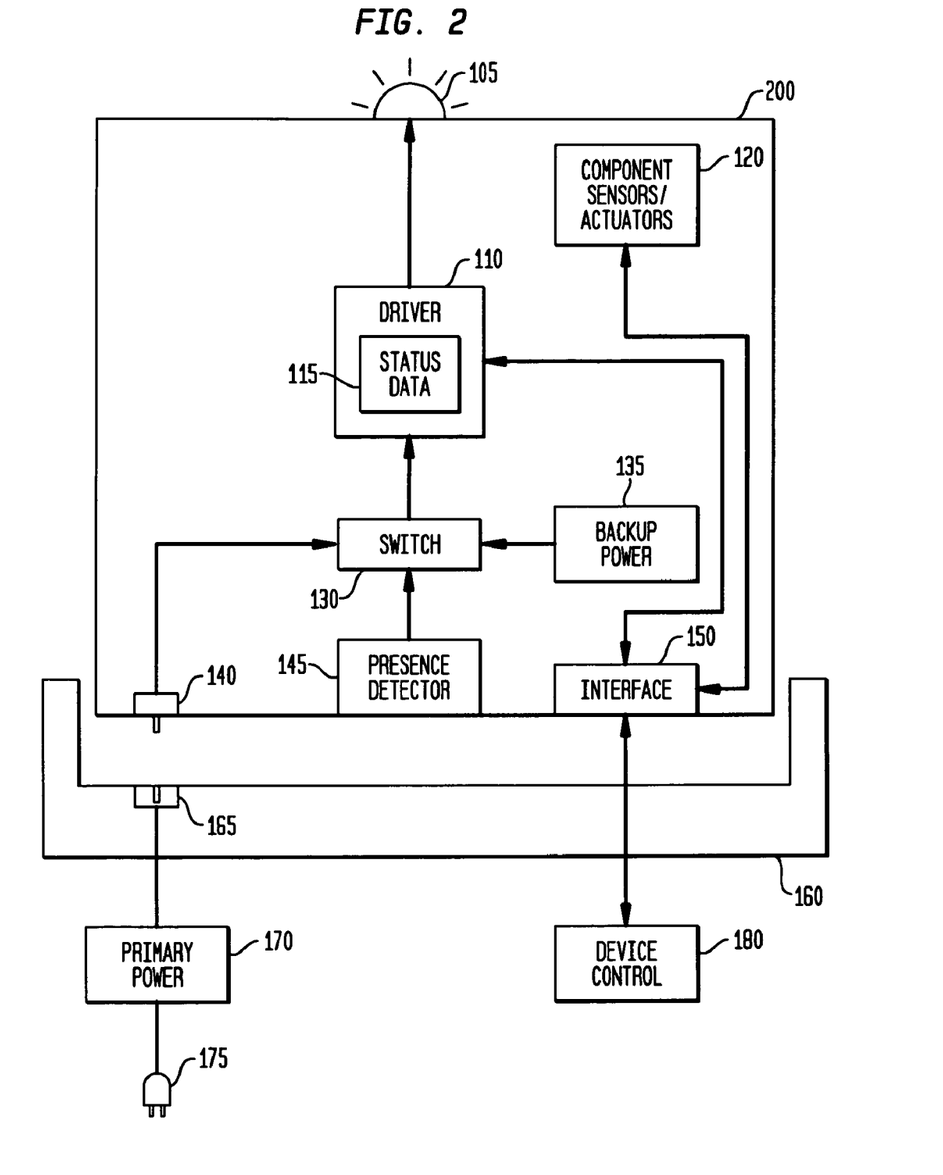
FIG. 2 illustrates a component in an electrically powered device, where diagnostic data is received from a device control, according to the invention.

FIG. 2 illustrates a component in an electrically powered device, where diagnostic data is received from a device control, according to the invention. The component 200 is analogous to the component 100 of FIG. 1, but the local control 125 is not used. An on-board diagnostic capability is therefore not provided for the component 200, and all diagnostic processing is carried out by the device control 180, which provides the status data for controlling the indicator 105 directly to the data storage device 115 via the component's interface 150. For example, the component 200 may be a modular power supply that has replaceable parts but which does not have a facility to diagnose failures at the module level. In this case, the device control 180, which is the main control of the device, runs the diagnostics, and in the event of a failure, sets the state of the diagnostic indicator 105. The device control 180 could set or clear the latch of the status data in the data storage device 115. The device control 180 could also oversee the non-diagnostic functions of the component 200.

Figure 3:
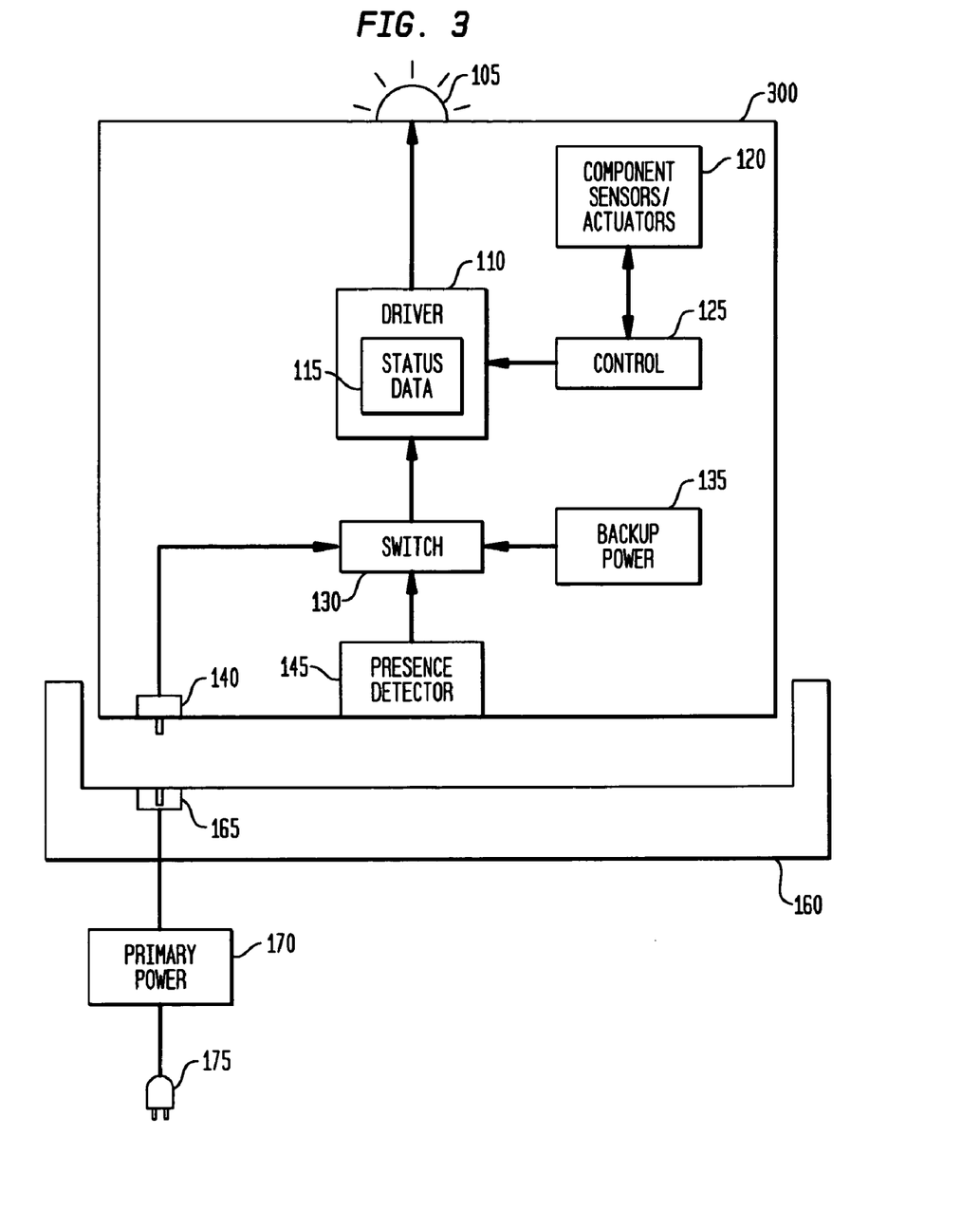
FIG. 3 illustrates a component in an electrically powered device, where diagnostic data is produced at the component, according to the invention.

FIG. 3 illustrates a component in an electrically powered device, where diagnostic data is produced at the component, according to the invention. The component 300 is analogous to the component 100 of FIG. 1, but there is no interface 150 to the higher-level device control 180. In this case, the control 125 provides the on-board diagnostic capability, responsive to signals from the component sensors and/or actuators 120, to provide the status data for controlling the indicator 105 directly to the data storage device 115.

Figure 4:
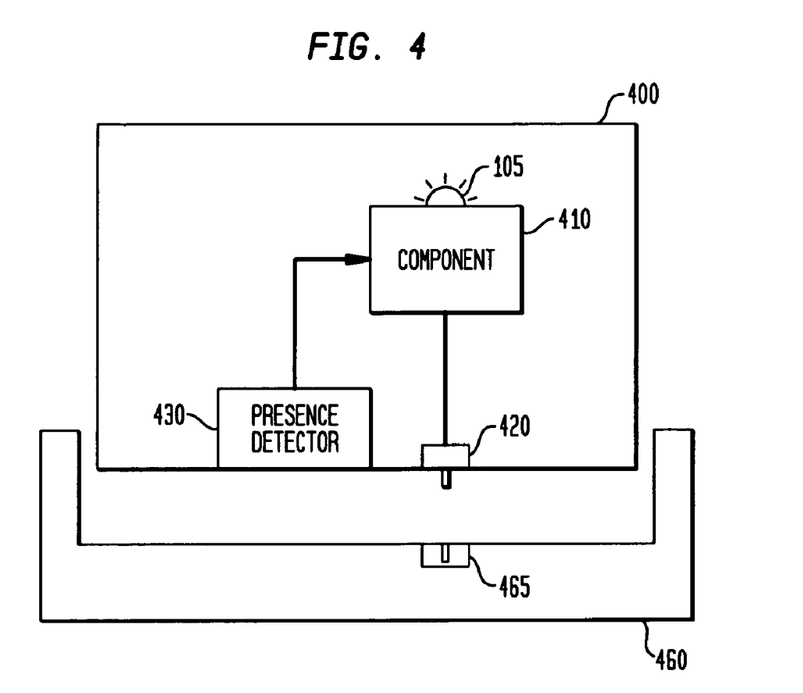
FIG. 4 illustrates a component in an electrically powered device, where the component includes a presence detector for detecting when the component is removed from a slot in a chassis of the electrically powered device, according to the invention.

FIG. 4 illustrates a component in an electrically powered device, where the component 410 with its diagnostic indicator 105 is located or enclosed within a higher-level assembly 400. The higher-level assembly 400 includes a presence detector 430 for detecting when it is removed from a slot 460 in a chassis of the electrically powered device, according to the invention. A jack 420 connects to a socket 465 in the slot 460 when the higher-level assembly 400 is installed in the slot 460, to receive the primary power from the electrically powered device. The primary power is connected via the jack 420 to the component 410. The presence detector 430 may function similarly to the presence detector 145 of FIG. 1. For example, switch 130 within the component 410 may connect the backup power source to the indicator 105, data storage device and driver when the presence detector 435 indicates the higher-level assembly 400 has been removed from the slot 460 and therefore has lost the primary power source. The switch 132 (FIG. 1) may delay connecting the backup power source 135 to the indicator 105, as discussed further below, until the presence detector 430 indicates the component 410 has been removed from the slot 460, for example, by the technician.

Figure 5:
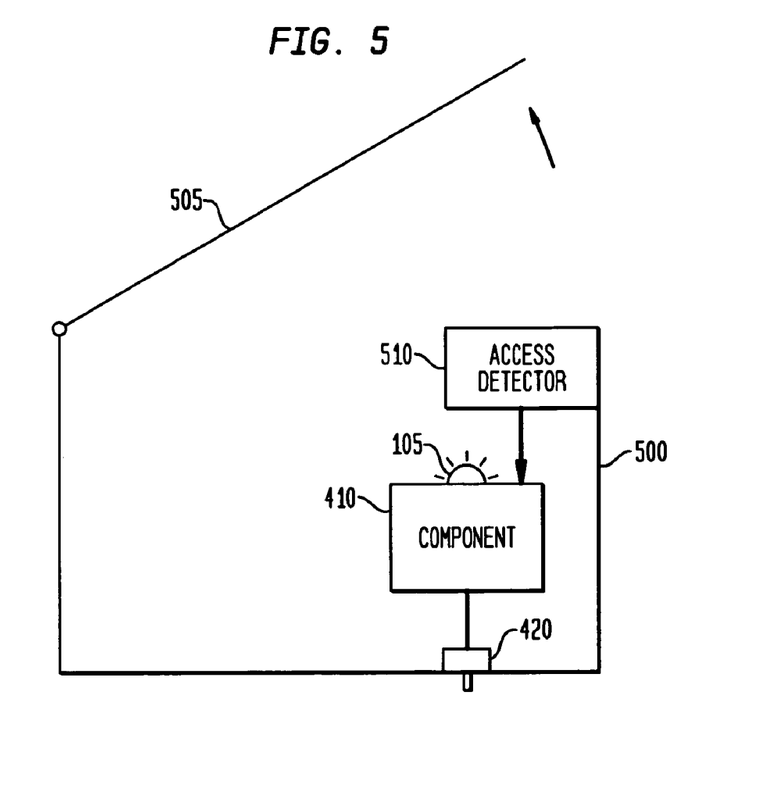
FIG. 5 illustrates a component in a higher-level assembly in an electrically powered device, where the higher-level assembly includes an access detector for detecting when the higher-level assembly has been opened to access the component, according to the invention.

FIG. 5 illustrates the component 410 with its diagnostic indicator 105 in a higher-level assembly 500 in an electrically powered device, where the higher-level assembly 500 includes an access detector 510 for detecting when the higher-level assembly 500 has been opened to access the component 410, according to the invention. The higher-level assembly 500 includes an example access panel, lid or door 505 which the technician opens to access the component 410. In this situation, the technician cannot view the indicator 105, when the indicator is a light, because it is covered by the door 505. Accordingly, it is not necessary to provide power to the indicator 415 until the access detector 510 detects that the higher-level assembly 500 has been opened. The access detector 510 may use a switch, for instance, that closes or opens a circuit when the door 505 is opened. The component 410 may use the switch 132 of FIG. 1 to separately power the diagnostic indicator 105. In this case, the switch 132 is responsive to the access detector 510 for connecting the backup power source 135 to power the diagnostic indicator. This approach reduces the drain on the backup power source because it avoids powering the indicator 105 unnecessarily. However, note that the backup power should be provided to the data storage device 115 as soon as the primary power source is removed to maintain the status data stored thereat.

Figure 6:
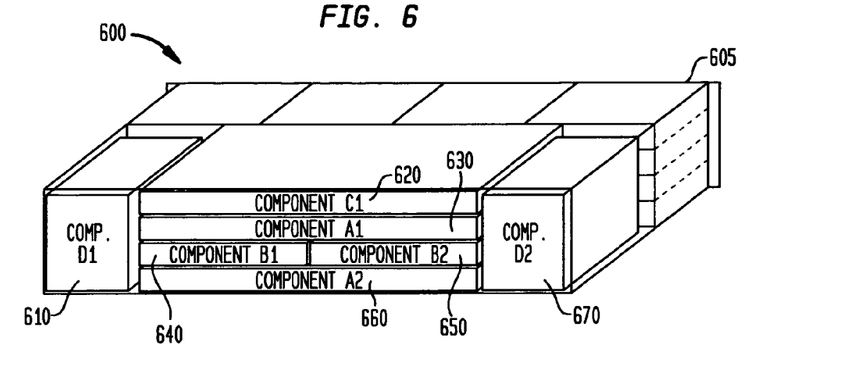
FIG. 6 illustrates multiple components and assemblies in a device, according to the invention.
Figures 7, 8:
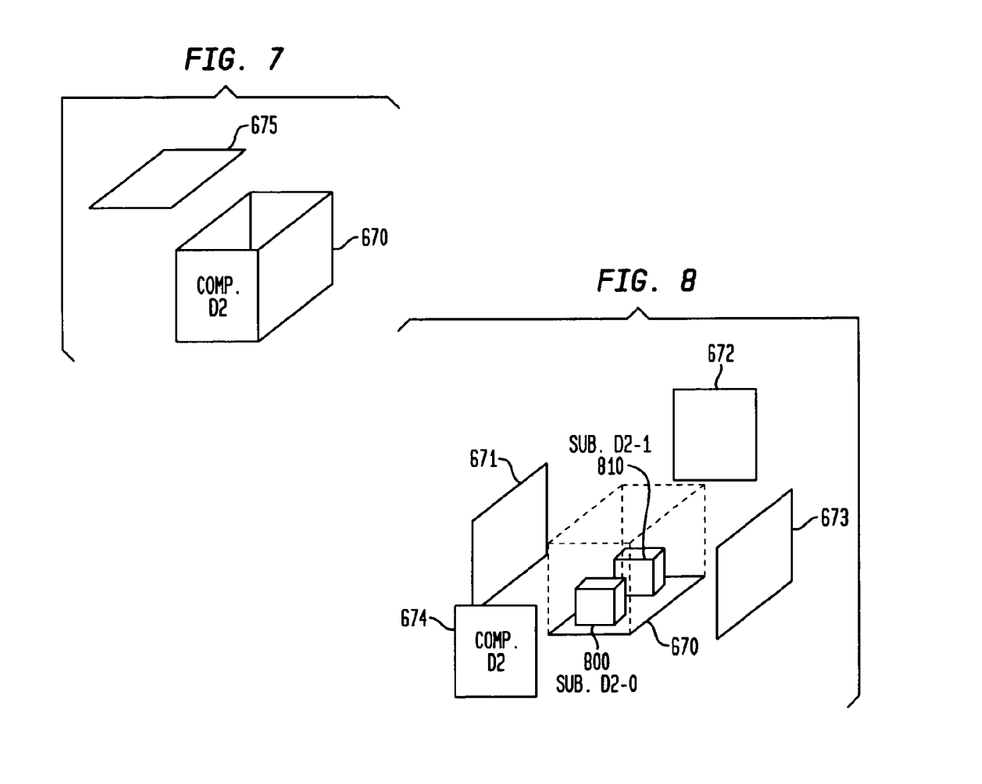
FIG. 7 illustrates a sub-assembly in a device that is opened to access a component, according to the invention.
FIG. 8 illustrates components provided within a sub-assembly, according to the invention.

FIG. 6 illustrates multiple components and assemblies in a device, according to the invention. Typically, an electrically powered device such as a storage controller or other type of device includes its components in different sub-assemblies such as cabinets and the like that must be removed, opened and/or disassembled to some extent to access the components. The example device 600 includes a chassis 605 with a number of components installed therein. Components D1 (610) and D2 (670) are higher-level assemblies, while components C1 (620), A1 (630), B1 (640), B2 (650) and A2 (660) are individual components. FIG. 7 illustrates the sub-assembly component D2 (670) which has been removed from the chassis 605 by the technician. The technician may know, through experience or by following a trouble shooting routine, for instance, that a problem component is likely to be in a given sub-assembly by the nature of the malfunction of the device. An access panel or door 675 has been removed by the technician to gain access to the inside of the component D2 (670). FIG. 8 illustrates an exploded view of the component D2 (670), showing its walls 671, 672, 673 and 674. Sub-components D2-0 (800) and D2-1 (810) are provided within the component D2 (670). The component D2 (670) is analogous to the higher-level assembly 500 of FIG. 5, where the access detector 510 may be used to avoid powering the diagnostic indicator with backup power until the component D2 (670) has been opened by the technician, thereby exposing the diagnostic indicator or indicators of the component or components within, e.g., components D2-0 (800) and D2-1 (810), which are analogous to component 410 in FIG. 5. This approach reduces unnecessary use of the backup power, thereby extending its life.

The invention has been described herein with reference to particular exemplary embodiments. Certain alterations and modifications may be apparent to those skilled in the art, without departing from the scope of the invention, The exemplary embodiments are meant to be illustrative, not limiting of the scope of the invention, which is defined by the appended claims.

What is claimed is:

1. A component in an electrically powered device for performing a function of the electrically powered device, comprising:
   a diagnostic indicator for indicating a diagnostic status of the component by indicating at least a need of servicing or replacement of the component;
   wherein the diagnostic indicator receives power from a primary power source that is associated with the electrically powered device when the primary power source is available to the component;
   a self-contained power source; and
   at least one switch for connecting the self-contained power source to power the diagnostic indicator when the primary power source is unavailable to the component.

2. The component of claim 1, further comprising:
   a housing for holding the self-contained power source and the at least one switch;
   wherein the diagnostic indicator is provided on the housing.

3. The component of claim 1, wherein:
   the primary power source is available to the component when the component is installed in the electrically powered device; and
   the primary power source is unavailable to the component when the component is removed from the electrically powered device.

4. The component of claim 1, wherein:
   the diagnostic indicator comprises a light.

5. The component of claim 1, wherein:
   the self-contained power source comprises a battery.

6. The component of claim 1, wherein:
   the component is removable from the electrically powered device for at least one of servicing and replacement.

7. The component of claim 1, wherein:
   the primary power source is unavailable to the component when a user disconnects the primary power source from the component as a safety precaution when servicing or replacing the component.

8. The component of claim 1, wherein:
   the primary power source is unavailable to the component when a user removes a higher-level assembly, in which the component is provided, from the electrically powered device, to access the component, thereby disconnecting the component from the primary power source.

9. The component of claim 8, further comprising:
   an access detector that indicates when the higher-level assembly has been opened to access the component;
   wherein the at least one switch is responsive to the access detector.

10. A component in an electrically powered device for performing a function of the electrically powered device, comprising:
    means for indicating a diagnostic status of the component by indicating at least a need of servicing or replacement of the component;
    wherein the means for indicating receives power from a primary power source that is associated with the electrically powered device when the primary power source is available to the component;
    a self-contained power source; and
    means for connecting the self-contained power source to power the diagnostic indicator when the primary power source is unavailable to the component.

11. An apparatus for use in a component in an electrically powered device, comprising:
    a self-contained power source; and
    at least one switch for connecting the self-contained power source to power a diagnostic indicator of the component when a primary power source that is associated with the electrically powered device is unavailable to the component;
    wherein diagnostic indicator indicates a diagnostic status of the component by indicating at least a need of servicing or replacement of the component.

12. A method for powering a component having a diagnostic indicator, where the component is provided in an electrically powered device for performing a function of the electrically powered device, comprising:
    receiving power, at the component, from a primary power source that is associated with the electrically powered device when the primary power source is available to the component;
    connecting the primary power source to power the diagnostic indicator when the primary power source is available to the component; and
    connecting a self-contained power source of the component to power the diagnostic indicator for indicating at least a need of servicing or replacement of the component when the primary power source is unavailable to the component.

13. A program storage device tangibly embodying a program of instructions executable by a machine to perform a method for powering a component having a diagnostic indicator, wherein the component is provided in an electrically powered device for performing a function of the electrically powered device, and wherein the component receives power from a primary power source that is associated with the electrically powered device when the primary power source is available to the component, the method comprising:
    connecting the primary power source to power the diagnostic indicator when the primary power source is available to the component; and
    connecting a self-contained power source of the component to power the diagnostic indicator for indicating at least a need of servicing or replacement of the component when the primary power source is unavailable to the component.

* * * * *